United States Patent [19]

Fridman et al.

[11] 4,406,962

[45] Sep. 27, 1983

[54] COMMUTATOR ELECTRIC MACHINE

[76] Inventors: Georgy N. Fridman, Leninsky prospekt, 61, kv. 40; Vladilen K. Kalashnikov, ulitsa Scherbakovskaya, 40/42, kv. 119; Vladimir M. Biznya, ulitsa Scherbakovskaya, 40/42, kv. 189; Efim M. Kovarsky, ulitsa Scherbakovskaya, 40/42, kv. 209; Boris A. Borisov, ulitsa Akademika Komarova, 12, kv. 117; Lev S. Semenov, ulitsa Krasnykh Zor, 53, kv. 27; Valentin A. Malyshev, Volzhsky bulvar, 18 korpus 2, kv. 118; Nikolai S. Voronin, Gruzinsky val, 18/15, kv. 98; Lev. N. Staskevich, Ryazansky prospekt, 48 kv. 47, all of Moscow; Evgeny F. Zinin, Moskovskaya oblast, ulitsa Kalinina, 9, kv. 3, Zheleznodorozhny; Galina M. Dulitskaya, ulitsa F. Poletaeva, 15, korpus 3, kv. 19; Elvira R. Shegai, ulitsa Krasny Kazanets, 19 kv. 75, both of Moscow, all of U.S.S.R.

[21] Appl. No.: 264,685

[22] Filed: May 18, 1981

[51] Int. Cl.³ .............................................. H02K 13/10
[52] U.S. Cl. .................................... 310/233; 310/186; 310/223
[58] Field of Search .............. 310/211, 186, 233–237, 310/220–225, 219, 135; 29/597

[56] References Cited

U.S. PATENT DOCUMENTS

| 1,335,144 | 3/1920 | Walker | 310/224 |
| 1,358,691 | 11/1920 | Allen | 310/223 |
| 2,319,614 | 5/1943 | Linville | 310/224 |
| 2,470,096 | 5/1949 | Eck | 310/220 UX |
| 4,019,076 | 4/1977 | Bates | 310/233 |
| 4,322,650 | 3/1982 | Mabuchi | 310/220 |

FOREIGN PATENT DOCUMENTS

| 54516 | 10/1956 | Fed. Rep. of Germany | 310/233 |
| 525259 | 9/1921 | France | 310/233 |
| 1547093 | 6/1979 | United Kingdom | 310/221 |

OTHER PUBLICATIONS

Industrial Engineering Library, E. Arnold and I. L. La-Court, Direct Current Machines, vol. 1, Theory and Research, (English Translation).

M. P. Kostenko and L. M. Piotrovsky, Electric Machines, Part Two, Alternating Current Machines, Third, Revised Edition, (English Translation).

Primary Examiner—R. Skudy
Attorney, Agent, or Firm—Lilling & Greenspan

[57] ABSTRACT

The disclosed commutator electric machine comprises a field magnet structure electromagnetically connected with the armature having a winding; a commutator including main bars and at least one auxiliary bar for each main bar interconnected by an interbar current-conducting spacers, the electric contact between the interbar current-conducting spacers and the commutator bars taking place along the side surfaces of the bars and being ensured by compression effected in the process of the manufacture of the commutator structure and brushes of the commutator structure. The main commutator bars are also connected to the winding sections of said armature.

6 Claims, 14 Drawing Figures

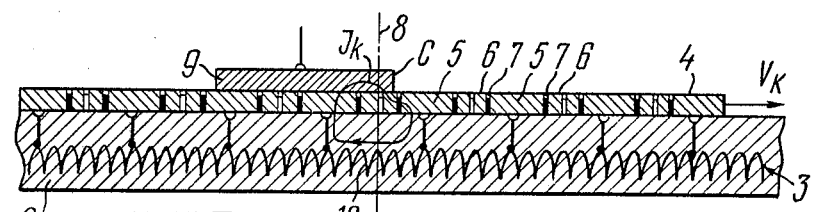
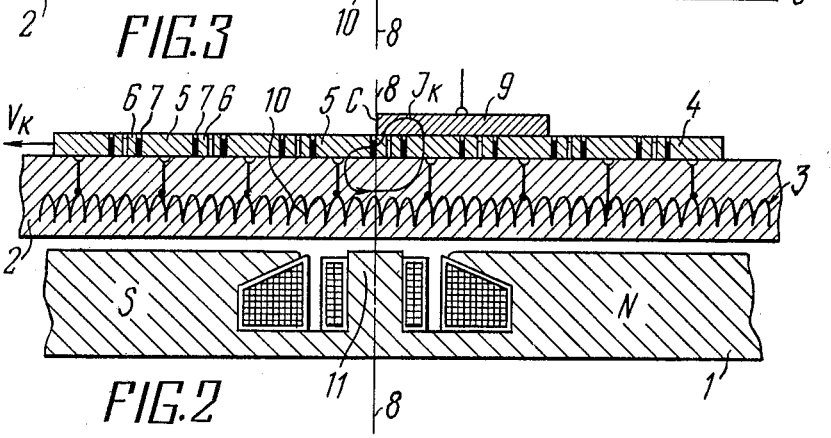
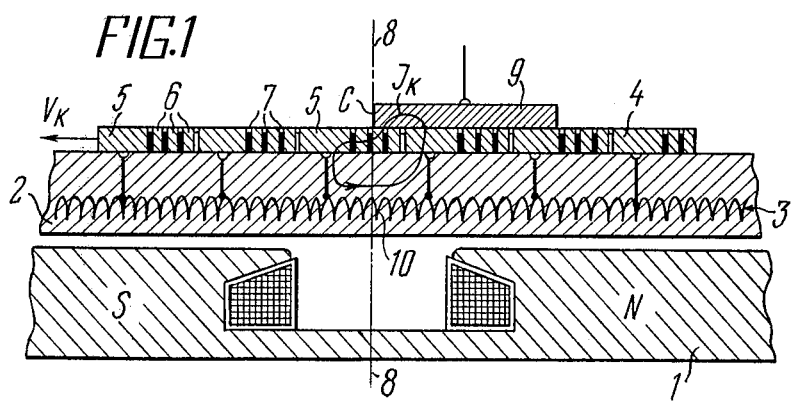

COMMUTATOR ELECTRIC MACHINE

FIELD OF THE INVENTION

The present invention relates to electric machines and, more particularly, it relates to direct-current and alternating-current commutator-type electric machines.

The invention can be utilized in electrical engineering, e.g. in the fabrication of commutator electric machines, such as those with heavy commutation duties, as well as of numerous other d.c. and a.c. electric machines produced in standardized families, in traction and rolling-mill motors, in micromachines, such as those manufactured for household electric appliances.

DESCRIPTION OF THE PRIOR ART

There is known an electric machine comprising a field magnet structure electromagnetically connected with the armature having a winding and a commutator made of a plurality of bars or segments, each section of the armature winding being connected in series with the corresponding commutator bar through series resistor means (cf. "Electric Machines" by M. P. Kostenko and L. M. Piotrovski, Part 2, p.564, "ENERGIYA" Publishers, Leningrad Division, 1973—in Russian). Structurally, the series resistor means are made either of a pure metal or an alloy of a high ohmic resistance and are usually accommodated in the armature winding slots.

A shortcoming of the known arrangement is that the series resistors are of considerable dimensions to provide for the fact that the full working current of the motor flows therethrough. In the starting mode, when the motor starts under a load, the series resistors display a tendency to overheat and even to burn.

Moreover, these series resistors significantly complicate the structure of the armature, affect the efficiency factor of the motor and add to overheating of the motor winding.

There is also known a commutator electric machine wherein the commutator has its every pair of main bars or segments spaced by either one or two auxiliary bars or segments of the same width as the main bars or segments, connected with the adjacent main bar or segment in the direction of the armature rotation through ohmic resistors (cf. "Direct-Current Machines" by E. Arnold and P. L. La-Coure, GOSTECHIZDAT Publishers, Moscow, 1931, Vol. 1, pp. 284–285—in Russian).

A shortcoming of a commutator electric machine of this kind is the inadequate utilization of the contact surface of the commutator. Besides, the series resistors are made of metal and can be mounted solely exteriorly of the commutator. The electric connection between the series resistors and the commutator is effected by either soldering or welding.

With the armature rotating, the series resistors are to be retained on the rotating commutator with aid of retaining bands or other retaining means. This complicates the manufacture of the armature, to say nothing of the weight and dimensions of the machine, as a whole, being increased.

SUMMARY OF THE INVENTION

It is an object of the present invention to provide a simplified construction of a commutator electric machine of reduced weight and dimensions, which should at the same time utilize completely every advantage of incorporating ohmic resistors in the commutator structure.

It is another object of the present invention to reduce the amount of copper in the electric machine by as much as 20 to 30 percent and to reduce the contact losses by as much as an order of magnitude.

It is still another object of the present invention to enhance the reliability and to prolong the service life of the electric machine.

These and other objects are attained by a commutator electric machine comprising a field magnet structure electromagnetically connected with the armature having a winding; a commutator with main and auxiliary bars electrically connected to one another, the main bars being connected with the winding sections of the armature; and brushes adapted to engage the commutator. In accordance with the invention, in the commutator structure each main bar and at least one auxiliary bar are interconnected by an interbar current-conducting separator or spacer. The electric contact between the spacers and the respective bars takes place along the lateral or side surface thereof and is ensured by compression effected in the course of the fabrication of the commutator.

This construction of a commutator electric machine does not require additional space for accomodation and securing of the series resistors and significantly facilitates the fabrication under quantity production conditions, since the current-conducting interbar separators or spacers would not increase the dimensions of the commutator. There is no need to either solder or weld them to the main and auxiliary bars, because the reliable electric contact therebetween is ensured by the high degree of compression (archtype outward thrust) effected in the course of conventional technology of manufacturing the commutator.

It is expedient to use low-magnetic, corrosion proof and low-friction steel grades as the material of the commutator bars.

The commutator bars being made of stronger and better-wearing materials, although less electrically conducting ones, becomes possible only in the machines of this construction, because the energy evolving at the interbar current-conducting spacers at the final stage of the commutation dissipates uniformly along the entire lateral or side surface of the commutator bars. This essential difference between the disclosed commutation process and the processes of commutation in conventional commutator electric machine, where the final stage of the commutation process involves the appearance of high current densities at the trailing edges of the brush and of the commutator bars, results in the energy density evolving in the interbar current-conducting spacers being very low.

In the case of electric machines with heavy commutation duties, it is expedient to make the brushes of a highly electrically conducting material with a low value of contact resistance.

Thus, in electric machines with heavy commutation duties, it is expedient to associate the steel commutator bars not with the generally employed electro-graphite brushes with their high values of contact resistance, but brushes where the contact losses are as low as possible, e.g. known per se types of metal-graphite and all-metal brushes of which the use in the herein described kind of machines of the conventional versions is prohibited by the low commutation ability of the last-mentioned brushes.

The use of the brushes with low contact losses, while not affecting the process of commutation in machines embodying the invention, enables an increase of the current densities in the sliding-contact means (the brushes) to as high as 100–200 A/cm$^2$, as against the permissible densities in electric-graphite brushes of about 10 to 15 A/cm$^2$, and thus reduces the contact losses by as much as an order of magnitude, to reduce significantly the dimensions of the brush-commutator assembly, while decreasing at the same time the degree of overheating of the commutator and increasing the overall efficiency factor of commutator electric machines embodying the invention.

In the case of electric machines devoid of intermediate pole pieces, with irreversible rotation, the number of the auxiliary bars connected to the main bar of the commutator through the interbar current-conducting spacers is preferably selected, in accordance with the invention, from a range of one to three.

The incorporation in the commutator of an increased number of the auxiliary bars connected each to the main bar of the commutator in a series fashion through interbar current-conducting spacers is equivalent to cutting into the squirrel-cage circuit of the winding section of the armature, at the final stage of its commutation, three stages of successively rising ohmic resistance. This pattern significantly enhances the commutation quality of such machines and enables to spread the use of electric machines without intermediate or commutating poles, which are less costly than machines with intermediate or commutating poles.

It may also be expedient to make the interbar current-conducting spacers or separators of current-conducting polymeric compositions 0.1 to 1.0 mm thick, with the ohmic resistance of 0.1 to 20 Ohm.

The interposing of such interbar current-conducting spacers in the commutator structure between the main and auxiliary bars provides for manufacturing commutators of a minimized diameter.

It is further expedient that the width of the auxiliary or intermediate bars by their contact surface should be 0.1 to 1.0 the width of the main bars.

In this way it is possible to have a commutator of the minimized diameter of its contact surface.

BRIEF DESCRIPTION OF THE DRAWINGS

The present invention will be further described in connection with embodiments thereof, will reference being made to the accompanying drawings, wherein:

FIG. 1 is a sectional view, illustrating a commutator electric machine without intermediate poles, of the irreversible type, embodying the invention;

FIGS. 2 and 3 are sectional views, illustrating a commutator electric machine with intermediate or commutating poles, of the reversible type, embodying the invention;

DETAILED DESCRIPTION OF THE INVENTION

Figure 4:
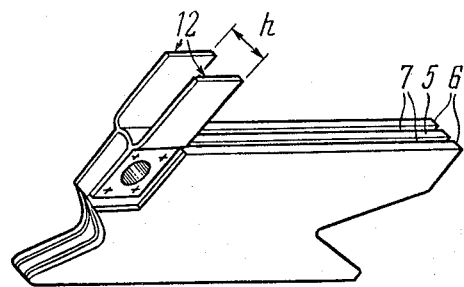
FIG. 4 is a perspective view of the main and auxiliary bars of a single commutator unit or division, with interbar current-conducting spacers, for a machine of the reversible type, in accordance with the invention.

Referring now in particular to the appended drawings, the commutator electric machine embodying the invention comprises a field magnet structure 1 (FIG. 1) devoid of intermediate or commutating poles. An armature 2 with a sectionated winding 3 is received in the field magnet structure 1 for rotation. A commutator 4 is provided wherein each single commutator unit or division includes one main bar 5 and three auxiliary bars 6 arranged to one side of the respective main bar 5 and electrically connected to one another and to the main bar 5 through interbar electrically conducting spacers or separators 7.

At the neutral line 8, intermediate the main poles of the field magnet structure 1, there is located the trailing end C of the brush 9.

Let us consider the operation of this electric machine.

With the armature rotating in the direction $V_k$ (from right to left in the drawing), the brush 9, while running off the main commutator 5 at the final stage of the commutation process, would not break the squirrel-cage circuit of the winding section 10 with its current $I_k$, as is the case with conventional commutator electric machines, but would instead successively cut into this circuit three stages of rising ohmic resistance defined by the three interbar current-conducting separators or spacers 7.

The cutting into the commutating circuit of the increased ohmic resistance of the interbar current-conducting spacers 7 speeds up the commutation process and drastically reduces the commutation currents $I_k$ irrespectively of the voltage values. The value of the ohmic resistance of the interbar current-conducting spacers 7, which do not come into contact with the brushes 9 can be selected so as to ensure that no arc-forming takes place as the brush 9 runs off the main bar 5 and the successive auxiliary or intermediate bars 6, and that the spark formation is reduced to a safe level.

In accordance with another embodiment of the present invention, FIGS. 2 and 3 illustrate a reversible commutator electric machine wherein the field magnet structure 1 includes intermediate poles 11 and receives therein the armature 2 with the sectionated winding 3. A commutator 4 is provided wherein each unit or division includes one main bar 5 and two auxiliary or intermediate bars 6 at both sides of the respective main bar 5, electrically connected to the main bar 5 through interbar current-conducting spacers 7. The trailing end C of the brush 9 is located at the neutral line 8 centrally of the intermediate pole 11.

Let us consider the operation of the reversible electric machine embodying the invention.

With the armature 2 rotating in either direction, the brush 9 at the final stage of the commutation process runs off the main bar 5 onto the auxiliary bar 6 without breaking the squirrel-cage circuit of the winding section 10; while sliding in contact with the respective auxiliary bar 6, it cuts into this circuit an increased ohmic resistance defined by the interbar current-conducting spacer 7.

The intermediate poles 11 of the field magnet structure 1 are adjusted so that, by the time the trailing end C of the brush 9 runs off the main bar 5 onto the respective intermediate bar 6, the commutation process should be already terminated.

What remains by this time in the winding section 10 is the store of uncompensated electromagnetic energy caused solely by the degree of non-identity of the commutation cycles of the individual sections of the armature 2.

The value of the ohmic resistance of the squirrel-cage circuit of the winding section 10 of the armature 2 in commutator machines with intermediate poles 11 is in most cases substantially lower than that in commutator electric machines without intermediate poles; therefore, to provide spark-free operation of commutator electric machines with the intermediate poles 11, it will be in most cases sufficient to incorporate in the commutator structure 4, for each unit or division of the commutator and for each direction of the rotation of the armature, but a single auxiliary bar 6 electrically connected with the respective main bar 5 via a single interbar current-conducting spacer 7.

In the case of irreversible models, the number of auxiliary commutator bars 6 for each main bar 5 in commutator electric machines without intermediate poles may be increased to two and more.

In both modifications of the commutator electric machine embodying the invention, illustrated in FIGS. 1 and 2, 3, the width of the brushes 9 is selected to span at least one and a half of two widths of a single commutator unit or division. This enables the working current of the commutator electric machine to flow unobstructedly through the main bars 5 of the commutator 4. Current flows through the auxiliary bars 6 and through the interbar current-conducting spacers 7 exclusively at the final commutation stages. The electromagnetic energy of the squirrel-cage winding circuit, uncompensated in the commutation process and released at this stage, is transformed into Joule heat in the interbar current-conducting spacers 7.

The essential feature of the commutator electric machine embodying the invention is that the density of the energy released in the interbar current-conducting spacers 7 is, due to the electric contact between the spacers 7 along their side surface with the respective main and auxiliary bars 5 and 6 of the commutator 4, insignificantly low in comparison with the commutator electric machines of the prior art, where this energy is released at the trailing edges of the brush and of the main commutator bar. Hence, it is possible to make the commutator bars, in accordance with the invention, of materials that are far more strong and wear-resistant than copper and its alloys, although less heat- and electrically conducting, e.g. of low magnetic, low-friction and corrosion-proof grades of steel.

Let us consider some examples of using alloys of the following compositions (percent by weight) as the material of the main and auxiliary commutator bars:

| Example 1 | |
|---|---|
| Carbon (C) | 0.12 |
| Chrome (Cr) | 13 to 15 |
| Manganese (MN) | 13 to 15 |
| Nickel (Ni) | 1 to 1.5 |
| Iron (Fe) | balance. |
| Example 2 | |
| Carbon (C) | 0.15 |
| Chrome (Cr) | 16 to 18 |
| Manganese (Mn) | 13.5 to 15.5 |
| Nickel (Ni) | to 0.6 |
| Nitrogen (N) | 0.3 to 0.4 |
| Iron (Fe) | balance. |
| Example 3 | |
| Carbon (C) | 0.16 to 0.24 |
| Chrome (Cr) | 12 to 14 |
| Manganese (Mn) | 0.6 |
| Silicon (Si) | 0.6 |
| Iron (Fe) | balance. |

In addition to copper-saving and bringing down the manufacturing costs, the use of steel main and auxiliary bars 5 and 6 in the commutator 4 increases the mechanical strength, the monolithic quality and the service life of the commutators and machines, as a whole, manifold.

The incorporation in the commutator 4 of interbar current-conducting spacers or separators 7, enables to use in electric machines with heavy commutating duties, embodying the invention, of brushes similar to those used in machines with light commutation duties, made of a highly electrically conducting material with a low contact resistance, e.g. the known per se types of metal-graphite or all-metal brushes. This reduces, by increasing the current density in the brushes, the total contact losses by as much as a degree of magnitude, as well as reduces substantially the dimensions of the commutator-brush assembly, while at the same time decreasing the overheating of the commutator and increasing the overall efficiency factor of the electric machine of the commutator machine.

In miniature electric machines which more often than not have no intermediate poles, the number of the auxiliary bars 6 in a commutator with irreversible rotation may be as high as three, which reduces the number of the main bars 5 of the commutator 4 by using the known per se practice of offsetting the brushes from the neutral line 8, and to attain spark-free performance under heavier duties than those associated with commutator electric machines of the prior art.

Instead of metals and their alloys, the interbar current-conducting spacer or separator 7 can be made, in accordance with one feature of the present invention, of current-conducting polymeric compositions, e.g. of graphitized fabric, of moulded polymeric resin (epoxy resin, polyesters, etc.), from thin-sheet fabric-base laminates, paper-base laminates; alternatively, they can be in the form of filled-in compound.

The range of practically expedient thicknesses of the interbar current-conducting spacers 7 is essentially within 0.1 to 2.0 mm. The ohmic resistances of the finished interbar current-conducting spacers 7, as found from calculations and experiments, is preferably from 0.1 to 20 Ohms.

In embodiments where the commutator 4 has several auxiliary bars 6 per each main bar 5, the interbar current-conducting spacer 7 electrically connecting the main commutator bar 5 with the auxiliary bar 6 next to it is preferably of a lower ohmic resistance, with the resistance of each successive interbar current-conducting spacer 7 in the same commutator unit or division being several times greater than that of the preceding one.

To reduce the diameter of the commutator 4, the dimensions of the main and auxiliary bars 5 and 6 by their width may be substantially reduced in comparison with those of the commutator bars of commutator electric machines of the prior art.

This can be illustrated by an embodiment of a commutator unit or division shown in FIG. 4 as an example. The minimum width "h" of the commutator unit or division, as it can be seen in FIG. 4, is defined by the width of the neck or riser 12 of the main bar 5 of the commutator 4, for soldering thereinto the section of the winding 3 of the armature 2 (FIGS. 1, 2, 3). The dimension of the main bar 5 by the width is smaller than the width "h" (FIG. 4) of the commutator unit or division, so as to accommodate at the sides thereof the auxiliary bars 6 electrically connected to the main bar 5 via the interbar current-conducting spacers 7.

Various modifications of the structures of the main and auxiliary bars 5 and 6 within a single commutator unit or division are illustrated in FIGS. 5 to 13.

Figure 5:
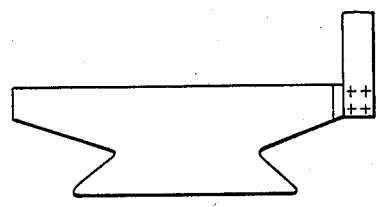
FIGS. 5 to 14 illustrate various modifications of a single commutator unit or division, with main and auxiliary bars and interbar current-conducting separators or spacers, in accordance with the invention.
Figure 6:
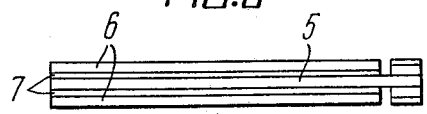
Figure 7:
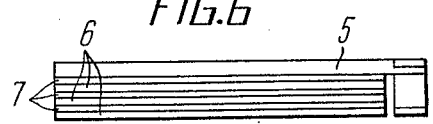
Figure 8:
Figure 9:
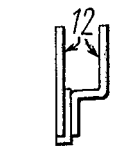
Figures 10, 11, 12, 13, 14:
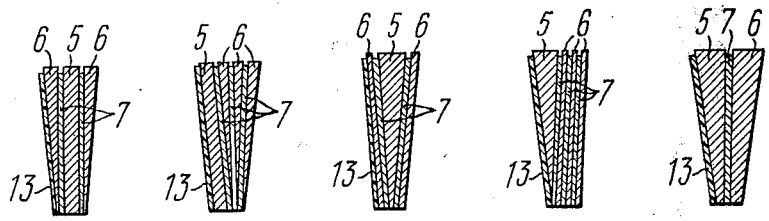

FIGS. 5, 6 and 7 illustrate the arrangement of the main and auxiliary bars 5 and 6 (in FIG. 6—for reversible models; in FIG. 7—for irreversible models). Correspondingly, FIGS. 8 and 9 show various modifications of the necks or risers 12 connectable to the main bar 5 of the commutator 4 (FIGS. 1, 2 and 3) by soldering, welding, riveting or by any other suitable known technique.

FIGS. 10, 11, 12, 13 and 14 are sectional view of several versions of the profiles of the main and auxiliary bars 5 and 6 of the commutator 4 and their combinations within a single commutator unit or division: main bars 5, auxiliary bars 6, interbar current-conducting spacers 7, mica separators 13. As it can be seen in FIGS. 10 to 14, both the main and auxiliary bars 5 and 6 can be manufactured either from sheet stock or from trapezoidal profile strips, so that each commutator division, when assembled, should meet the requirements of the trapezoidal profile, put before the commutator bars 5 and 6 of the hitherto known commutator electric machines. In each version, the width of the auxiliary bars 6 by the contact surface preferably is 0.1 to 1.0 the width of the main bars 5 by their contact surface. To make the commutator assembly less complicated FIG. 1 illustrates symmetrical profile of the bars.

Thus, due to the improved construction of the commutator assembly of a commutator electric machine, the weight and overall dimensions of the machine, as a whole, have been reduced; the amount of copper in the construction of the machine has been cut by 20 to 30 percent, the contact power losses have been reduced by an order of magnitude, and the reliability and service life of the commutator electric machine have been enhanced.

What we claim is:

1. A commutator electric machine, comprising: a field magnet structure; an armature having winding sections and electromagnetically connected with said field magnet structure; a commutator having main bars electrically connected with said winding sections of said armature, and auxiliary bars, each main bar of said commutator and at least one of said auxiliary bars of said commutator being electrically interconnected by interbar current-conducting spacers, the electric contact between said interbar current-conducting spacers and said bars of said commutator taking place along the side surfaces of said bars; and, brushes engaging said main and auxiliary bars of said commutator and not engaging said interbar current-conducting spacers of said commutator.

2. A commutator electric machine as set forth in claim 1, wherein low-magnetic corrosion-proof low-friction steel grades are used as the material of said main and auxiliary bars.

3. A commutator electric machine as set forth in claim 1, wherein said brushes are made of a highly electrically conducting material with a low contact resistance value.

4. A commutator electric machine as set forth in claim 1, wherein said machine has no intermediate poles, and the number of said auxiliary bars connectable to said main bar of said commutator by said interbar current-conducting spacers is within a range from 1 to 3.

5. A commutator electric machine as set forth in claim 1, wherein said interbar current-conducting spacers are made of current conducting polymeric compositions 0.1 to 2.0 mm thick, with an ohmic resistance from 0.1 to 20 Ohms.

6. A commutator electric machine as set forth in claim 2, wherein the width of said auxiliary bars by the contact surface thereof is 0.1 to 1.0 the width of said main bars by their contact surface.

* * * * *